United States Patent [19]

Ise et al.

[11] 4,071,292
[45] Jan. 31, 1978

[54] FOCUSSING PLATE

[75] Inventors: Katsuhiro Ise, Sakai; Yoshio Kuramoto, Toyonaka; Yasuo Yamazaki, Kawachi-Nagano, all of Japan

[73] Assignee: Minolta Camera Kabushiki Kaisha, Osaka, Japan

[21] Appl. No.: 710,987

[22] Filed: Aug. 2, 1976

[30] Foreign Application Priority Data

Aug. 27, 1975  Japan .................................. 50-104233

[51] Int. Cl.$^2$ ............................................. G03B 21/60
[52] U.S. Cl. .................................................... 350/128
[58] Field of Search ................... 350/9, 188, 117, 122, 350/128; 354/155, 152, 154

[56] References Cited

U.S. PATENT DOCUMENTS

| 1,044,135 | 11/1912 | Buechner | 350/127 |
| 2,275,602 | 3/1942 | Beck et al. | 350/188 X |
| 2,480,031 | 8/1949 | Kellogg | 350/127 |
| 2,589,014 | 3/1952 | McLeod | 350/128 UX |
| 3,208,341 | 9/1965 | Hosterman et al. | 350/9 UX |
| 3,314,742 | 4/1967 | Morgan | 350/117 |
| 3,844,644 | 10/1974 | Martinez | 350/117 |

FOREIGN PATENT DOCUMENTS 652,694   5/1951   United Kingdom ................. 350/128

Primary Examiner—Donald A. Griffin
Attorney, Agent, or Firm—Wolder & Gross

[57] ABSTRACT

A large number of cones such as circular cones or pyramids, or conical recesses are regularly uniformly distributed and formed on a surface of a transparent focussing plate. Each cone or conical recess has a large number of fine irregularities on the sloping surface thereof to thereby diffuse the light passing through the sloping surface.

17 Claims, 10 Drawing Figures

Fig.3 (PRIOR ART)          Fig.5
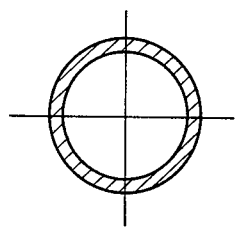     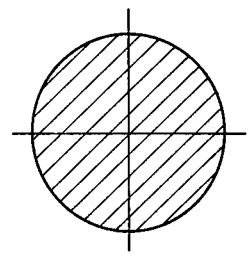
Fig.4                     Fig.6
     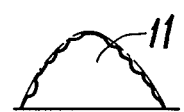
Fig.7 (PRIOR ART)
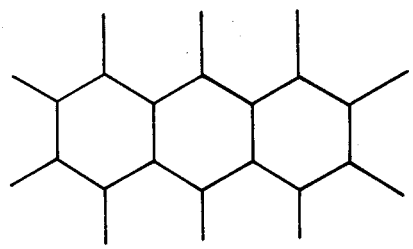

FOCUSSING PLATE

BACKGROUND OF THE INVENTION

The present invention relates generally to improvements in a focussing plate and it relates more particularly to an improved focussing plate on one surface of which there are orderly distributed and formed innumerable minute conical projections or cavities of a conical shape.

A prior art focussing plate has on one face a light diffusing surface on which a large number of minute irregularities are randomly formed. However, such a prior art focussing plate poses a problem that light is diffused in all directions so that only a small amount of light reaches the observer's eye, thereby presenting a dark image, when viewed. Attempts to avoid this shortcoming have been proposed in U.S. Pat. No. 2,589,014 and Japanese laid open patent application SHO No. 48-95827 which provide a focussing plate having on its surface minute conical projections, pyramids or cavities of a conical shape which are orderly arranged, rather than minute irregularities. FIGS. 1 (a), (b), (c) and (d) of the drawings herein represent conical projections formed on one surface of a focussing plate proposed in the above publications. With the focussing plates thus proposed, emergent light tends to be directed in specific directions commensurate with the angle of slope of the conical projections or cavities, so that a suitable selection of an angle of slope leads to the presentation of an image having almost the same brightness as that of an image obtained through a transparent plate.

However, such focussing plates having the aforesaid conical projections or cavities suffer from another shortcoming in that the appearance of a defocussed image is entirely different from the appearance of an image formed on the surface of a film. FIG. 2 shows the optical paths of light rays or fluxes from a light source (a photographic object) which have passed through the focussing plate of a type shown in FIG. 1(a). The light rays or fluxes I, II, III passing through an objective lens from a light source are divided into light fluxes A and B; C and D; and E and F, respectively, due to the refraction through the surfaces of the respective conical projections, being emergent at angles inclined to the incident angles of the light rays through the sloped surfaces of the respective conical projections. However, when the observer's eye is positioned on an optical axis, then only a light flux E', which is part of the emergent light flux E of the light flux I that has passed through an intermediate annular zone of an exit pupil of an objective lens reaches the observer's eye with the result that a defocussed image of a light source may be observed as a circle of confusion of ring shape, as shown in FIG. 3. The appearance of a defocussed image as shown in FIG. 3 is entirely different from that of an image on the surface of a film, the latter appearance giving a uniform density of image over the entire surface of the film resulting in the failure to obtain a picture by estimating the appearance of the image of the film from the appearance of the image on the focussing plate. With the aforesaid focussing plate, light fluxes which enter the observer's eye, as shown in FIG. 3, are only light fluxes which have passed through the intermediate annular zone or its outer peripheral portions in the exit pupil of the objective lens, so that when an objective lens is stopped down, then the above fluxes are blocked by a diaphragm, resulting in shading in the field of view. In addition, when used in combination with a Fresnel lens, then there appears moire patterns in the field of view, thus hindering satisfactory observation. Furthermore, when a light receiving element for use in TTL (through the lens) light measurement is placed in the rear of the focussing plate, then there results over-exposure or under-exposure depending on whether the light receiving element is positioned within a circle of confusion as shown in FIG. 3.

SUMMARY OF THE INVENTION

It is accordingly, a principal object of the present invention to provide a focussing plate of the above described type on which a bright defocussed image of a light source is formed by an objective with an appearance similar to that of the defocussed image of a light source formed on a film surface.

Another object of the present invention is to provide a focussing plate of the above described type which reduces the shading of the field of view when the diaphragm of the objective is stopped down to a small aperture.

Still another object of the present invention is to provide a focussing plate of the above described type which obviates the formation of a moire pattern when used with a Fresnel lens, and which is particularly suitable for TTL light measuring systems.

To accomplish these objects, a focussing plate consists of a transparent plate having on a surface thereof, a large number of conical surfaces, and the respective conical surfaces have a large number of irregularities which are fine enough not to spoil the conicity of the respective conical surfaces.

When passing through the focussing plate of the above construction after having traversed an objective, light rays from a light source, i.e., an object are diffused in all directions by the fine irregularities as well as deflected in specified directions by the conical surfaces. As the diffused light rays travel in all directions, directivity of the light rays emergent from the focussing plate is moderated. This provides a defocussed image on the focussing plate of an appearance similar to that of the defocussed image which is formed on the film surface through the objective. That is, the defocussed image which is viewed from the rear side of the focussing plate is blurred as a whole. In addition, as the irregularities are fine enough not to alter or spoil the general conicity of the respective conical surfaces, the deflected light rays still have considerably high intensity, so that the defocussed image on the focussing plate is viewed with considerably high brightness.

Moreover, even if the diaphragm of the objective is stopped down to a small aperture to block the light rays which pass through the peripheral portion of the objective, the light rays traversing the central portion of the objective impinge on the focussing plate and are then diffused by the fine irregularities when passing through the conical surfaces. Therefore, the defocussed image of the light source can be still viewed from the rear side of the focussing plate.

Further, the diffused light rays obviate or cancel moire patterns, which are otherwise formed when the focussing plate of the type having above described conical surfaces is used together with a Fresnel lens. And, as the directivity of the light rays emergent from the focussing plate is moderated as described above, a photosensitive element disposed behind the focussing plate and having a light receiving surface of a certain area generates an output commensurate with the average brightness of the light source, and thus the focussing plate according to the present invention is suitable for TTL light measuring systems particularly of the average light measuring type.

In the preferred embodiments of the present invention, the transparent plate has a large number of cones such as circular cones or pyramids, or conical recesses on a surface thereof, and the fine irregularities are formed on the sloping surfaces of the cones or the conical recesses. The sloping surfaces of the circular cones may be inclined at a predetermined angle to the surface of the transparent plate, or may have a curvature as descending therealong. Especially in the latter case, the directivity of the light rays emergent from the focussing plate is more moderated since the light rays deflected by the sloping surface travel in more directions than in the former case.

The above and other objects and features of the present invention will become apparent from the following descriptions taken in connection with the accompanying drawings.

BRIEF DESCRIPTION OF THE DRAWINGS

FIG. 3 shows a defocussed image of a point light source observed through the focussing plate shown in FIG. 1 (a);

FIG. 4 is a side view of a cone formed on a focussing plate according to a first embodiment of the present invention;

FIG. 5 shows a defocussed image of a point light source observed through the focussing plate according to the first embodiment;

FIG. 6 is a side view of a cone formed on a focussing plate according to a second embodiment of the present invention; and FIG. 7 shows section lines of hexagonal pyramids observed through a prior art focussing plate having such hexagonal pyramids on a surface thereof.

DESCRIPTION OF THE PREFERRED EMBODIMENTS

Figure 1A:
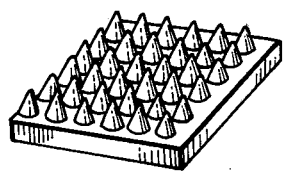
FIG. 1 (a) and (b) are perspective views of prior art focussing plates and FIGS. 1 (c) and (d) are side views of prior art conical surfaces formed on the focussing plates.
Figure 1B:
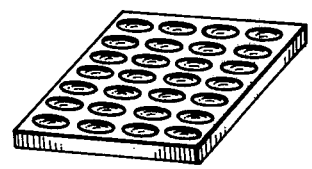
Figure 1C:
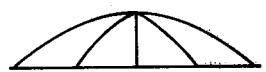
Figure 1D:
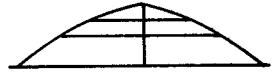

Referring now to FIG. 4 which shows one of the conical projections, a large number of which are formed on the surface of the transparent focussing plate of the first embodiment of the present invention, the individual conical projection is generally designated by the reference numeral 1 and is of a conical shape similar to that of the projection in the case of a focussing plate of FIG. 1, except for the formation of a plurality of irregularities 2 on the sloped surface of the projection. Since an eye-piece of a single lens reflex camera provides four times magnification, the length of the bottom side of the conical projection 1 should preferably be within a range from about 10 to 25 $\mu$, considering the resolving power of the human eye. On the other hand, the inclination angle $\alpha$ of the surface of the respective conical projection 1 to the face of the focussing plate should preferably be increased, considering ease of focussing. However, if the conical surface inclination angle is excessively large, then there results shading in the image to be observed. In general, a full aperture F-number of a standard interchangeable lens is 1.2 to 1.8. However, it happens that some interchangeable lenses occasionally have a full aperture F-number of 2.8 to 4.5 or 5.6. Accordingly, it is advantageous that the inclination angle $\alpha$ falls within the range of 10° to 20° in practical use. In addition, the width of the irregularities should not be such as one spoiling the basic conical shape, and thus preferably be within a range of about 1 to 6 $\mu$.

Figure 2:
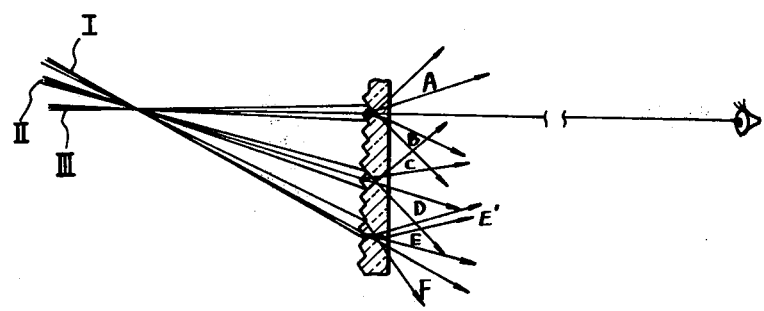
FIG. 2 is a cross sectional view showing the light rays passing through the focussing plate shown in FIG. 1 (a)

In case the light fluxes I, II, III as shown in FIG. 2 impinges on the focussing plate with the aforesaid arrangement the light fluxes A, B, C, D, E, F will be spread to a further extent than in the case of FIG. 2, so that all the light fluxes may enter the observer's eye, and a bright defocussed image having an appearance similar to that formed on the surface of a film (not shown) may be observed. In this respect, the respective conical projections 1 maintain their basic conical shapes, so that the components of the light fluxes having the same direction as that of the emergent flux E' of the light flux E still retains a large amount of light, thereby largely contributing to the formation of a defocussed image, coupled with diffused light of the emergent light fluxes A, B, C, D, F. Thus, there may be obtained a bright defocussed image as shown in FIG. 5, which is clear upon observation.

With the focussing plate of this embodiment, there may be observed a bright defocussed image having an appearance similar to that of the image on the surface of a film. In addition, even if the diaphragm for the objective lens blocks the aforesaid light fluxes I, II, there may be observed a defocussed image in accordance with the diffused light of the light flux III, although the image observed is dark, thereby maintaining a moderately bright field of view. When a light receiving element for use in TTL light measurement is placed in the rear of a focussing plate, then the brightness of an object (light source) may be uniformly measured, thereby permitting optimum exposure, even if the lens is interchanged. In addition, even if the focussing plate is used in combination with a Fresnel lens, the moire patterns are cancelled by the diffused light of fluxes II, III, thereby permitting easy observation of the field of view.

FIG. 6 shows another embodiment of the present invention in which there is shown a conical projection 11 having an outwardly convex side surface, on which a large number of irregularities are irregularly distributed and formed. With this embodiment, the direction of emitting light fluxes is continuously varied, providing emergent fluxes which are further widely spread, thereby permitting observation of a defocussed image having a uniform brightness.

While descriptions have been specifically given of the embodiments shown in the drawings, the present invention is by no means limited to these cases. For instance, the present invention is applicable to focussing plates having pyramids or cavities as shown in FIGS. 1 (b), (c), (d).

Moreover, with the prior art, focussing plates having innumerable pyramids positioned contiguous to each other, if a curvature is not given to the crossing portions of the respective pyramids, there appear crossing lines in a field of view as shown in FIG. 7, thus hindering observation of a defocussed image.

As is apparent from the foregoing, the light diffused by the irregularities of the conical projections, as in the present invention, may cancel the aforesaid crossing lines.

According to the focussing plate of the present invention, minute irregularities are provided on the sloped surfaces of conical projections or cavities of a conical shape which are provided on one surface of the focussing plate, so that an observer's eye may receive light fluxes having a large amount of light, which have been refracted through the sloped surfaces of respective conical projections or cavities of a conical shape, as well as diffused by the irregularities of the projections or cavities. Thus, there may be observed a defocussed image which is bright and has almost the same appearance as that of an image on the surface of a film. In addition, there may be jointly solved the aforesaid shading problem due to the diaphragm of an objective lens, the problem of moire patterns due to a combined use of a Fresnel lens, and a problem of erroneous light measurements in case a light receiving element for use in TTL light measurement is positioned in the rear of the focussing plate.

While there have been described and illustrated preferred embodiments of the present invention, it is apparent that numerous alterations, additions and omissions may be made without departing from the spirit thereof.

We claim:

1. In a single lens reflex camera, a focussing plate comprising a transparent plate on a surface of which is regularly formed a large number of conical surfaces;
   the improvement wherein said each conical surface has a large number of irregularities which are fine enough not to spoil the conicity of said respective conical surfaces.

2. The improvement as defined in claim 1, wherein said transparent plate has a large number of cones protruding from the surface thereof and said conical surfaces are the sloping surfaces of said cones.

3. The improvement as defined in claim 2, wherein said cones are circular cones.

4. The improvement as defined in claim 3, wherein said conical surface is inclined to the surface of said transparent plate at a given angle.

5. The improvement of claim 4, wherein said camera includes an objective lens and a viewing eyepiece, the diameter of each circular cone is approximately 10 $\mu$ to 25 $\mu$ so that each circular cone is invisible to the human eye when viewed through said eyepiece, the given angle is approximately 10° to 20° so that shading in the image viewed through said eyepiece and projected by said objective lens is dissolved, and the width of said each irregularity is approximately 1 $\mu$ to 6 $\mu$ so that the conicity of said respective circular cone is not spoiled by said irregularities.

6. The improvement as defined in claim 3, wherein said conical surface has a curvature along the length thereof.

7. The improvement as defined in claim 6 wherein said camera includes an objective lens and a viewing eyepiece, the diameter of each of said circular cones is approximately 10 $\mu$ to 25 $\mu$ so that each circular cone is invisible to the human eye when viewed through said eyepiece, and the width of each irregularity is approximately 1 $\mu$ to 6 $\mu$ so that the conicity of said respective circular cone is not spoiled by said irregularities.

8. The improvement as defined in claim 2, wherein said cones are pyramids.

9. The improvement as defined in claim 1, wherein said transparent plate has a large number of conical recesses on the surface thereof and said conical surfaces are the sloping surfaces of said conical recesses.

10. The improvement as defined in claim 9, wherein said conical recesses are circular conical recesses.

11. The improvement as defined in claim 9, wherein said conical recesses are pyramidal recesses.

12. In a single lens reflex camera a focussing device comprising a transparent base member having distributed on a face thereof a plurality of surfaces convergent from enlarged bases to respective apices and characterized in that said surfaces are each light diffusing and have fine light diffusing irregularities formed thereon.

13. The focussing device of claim 12 wherein said face has conical recesses formed thereon, the faces of which define said surfaces.

14. The focussing device of claim 12 wherein said face has conical protuberances formed thereon, the faces of which define said surfaces.

15. The focussing device of claim 12 wherein said surfaces are longitudinally curved.

16. The focussing device of claim 12 wherein said camera includes an objective lens and a veiwing eyepiece, each of said surfaces is of circular transverse cross-section and forms a predetermined angle to said base member face of approximately between 10° and 20° so that shading in the image viewed through said eyepiece and projected by said objective lens is dissolved and has a base of a diameter of between 10 $\mu$ and 25 $\mu$ so that each of said surfaces is invisible to the human eye when viewed through said eyepiece and said irregularities are of sizes approximately between 1 $\mu$ and 6 $\mu$ so that the overall shape of each of said surfaces is not spoiled by said irregularities.

17. The focussing device of claim 12 wherein said surfaces are of pyramidal configuration.

* * * * *